US005289678A

United States Patent [19]
Grutter

[11] Patent Number: 5,289,678
[45] Date of Patent: Mar. 1, 1994

[54] APPARATUS AND METHOD OF ON-BOARD CATALYTIC CONVERTER EFFICIENCY MONITORING

[75] Inventor: Peter J. Grutter, Plymouth, Mich.

[73] Assignee: Ford Motor Company, Dearborn, Mich.

[21] Appl. No.: 983,069

[22] Filed: Nov. 25, 1992

[51] Int. Cl.⁵ .................................. F01N 3/00
[52] U.S. Cl. ........................ 60/277; 60/274; 60/276; 60/285
[58] Field of Search ............... 60/274, 276, 277, 285

[56]     References Cited
         U.S. PATENT DOCUMENTS

| | | | |
|---|---|---|---|
| 3,939,654 | 2/1976 | Creps | 60/276 |
| 3,962,866 | 6/1976 | Neidhard et al. | 60/276 |
| 3,969,932 | 7/1976 | Rieger et al. | 60/277 |
| 4,007,589 | 2/1977 | Neidhard et al. | 60/276 |
| 4,027,477 | 6/1977 | Storey | 60/276 |
| 4,121,548 | 10/1978 | Hattori et al. | 60/276 |
| 4,251,990 | 2/1981 | Norimatsu et al. | 60/276 |
| 4,622,809 | 11/1986 | Abthoff et al. | 60/274 |
| 4,831,838 | 5/1989 | Nagai et al. | 60/274 |
| 4,840,027 | 6/1989 | Okumura | 60/274 |
| 5,077,970 | 1/1992 | Hamburg | 60/274 |
| 5,165,230 | 11/1992 | Kayanuma et al. | 60/276 |

FOREIGN PATENT DOCUMENTS 6445913 8/1987 Japan .
2178857 7/1985 United Kingdom .

OTHER PUBLICATIONS

Clemens et al.—SAE Technical Paper 900062, Detection of Catalyst Performance Loss Using On-Board Diagnostics, Feb. 26—Mar. 2, 1990.

Primary Examiner—Noah P. Kamen
Attorney, Agent, or Firm—Lorraine S. Melotik; Roger L. May

[57]     ABSTRACT

Apparatus and method are disclosed for monitoring catalytic converter efficiency in treating exhaust gas, for example from an internal combustion engine of a motor vehicle. In a dual closed loop fuel control system having switch-type exhaust gas oxygen (EGO) sensors located upstream and downstream of the catalytic converter, the number of times the downstream EGO sensor switches from rich to lean and/or visa versa is compared to the number of times the upstream EGO sensor switches during normal system operation over the course of a test period. A catalytic converter efficiency value is determined by calculating the ratio of the switching frequencies. The impact of the speed and load dependence of the downstream EGO sensor switching frequency can be reduced by a normalizing effect of the frequency ratio calculation. The efficiency value is compared to a stored value predetermined to correspond to a minimum acceptable efficiency of the catalytic converter. A failure signal can be generated when the efficiency value indicates catalytic converter efficiency below the minimum acceptable level.

4 Claims, 5 Drawing Sheets

APPARATUS AND METHOD OF ON-BOARD CATALYTIC CONVERTER EFFICIENCY MONITORING

FIELD OF THE INVENTION

This invention relates to monitoring of catalytic converter efficiency in treating exhaust gas from an internal combustion engine. In particular, the invention relates to air/fuel ratio closed loop fuel control of an internal combustion engine equipped with exhaust gas oxygen (EGO) sensors located upstream and downstream of a catalytic converter, with periodic on-board monitoring of the efficiency of the catalytic converter.

BACKGROUND OF THE INVENTION

It is known that the efficiency or efficacy of a catalytic converter treating the exhaust gas of an engine is significantly effected by the ratio of air to fuel supplied to the engine. At stoichiometric ratio, catalytic conversion efficiency is high for both oxidation and reduction conversions. The air/fuel stoichiometric ratio is defined as the ratio of air to fuel which in perfect combustion would yield complete consumption of the fuel. The air/fuel ratio LAMBDA of an air/fuel mixture is the ratio of (a) the amount by weight of air divided by the amount by weight of fuel actually being fed to the engine at a point in time, to (b) the air/fuel stoichiometric ratio. Closed loop fuel control systems are known for use in keeping the air/fuel ratio in a narrow range about the stoichiometric ratio, known as a conversion window. Closed loop fuel control systems are known utilizing one EGO sensor located before and one after the catalytic converter to maintain the air/fuel ratio inside the conversion window.

It is also known that the efficiency or efficacy of catalytic conversion is affected by the oxygen storage capability of the catalytic converter. A properly operating catalytic converter dampens oxygen concentration fluctuations in the exhaust stream. A system for testing catalytic converter efficiency proposed in SAE paper No. 900062, Detection of Catalyst Performance Using On-Board Diagnostics, employs two exhaust gas oxygen ("EGO") sensors, one upstream and one downstream of the catalytic converter, to detect oxygen content in the exhaust gas. The system employs test signals in the form of an air/fuel ratio swing on both sides of stoichiometry at predetermined rates or frequencies caused by fuel control system perturbations. By comparing the change in response patterns between the upstream and downstream EGO sensors, a determination can be made about catalytic converter efficacy.

A method is needed for accurately and reliably determining catalytic converter efficiency, especially in an on-board system, preferably a method which is suitable for incorporation into an overall fuel control system for the engine.

SUMMARY OF THE INVENTION

According to the invention, an on-board method is provided for monitoring catalytic converter efficiency in treating exhaust gas, typically passed directly from an internal combustion engine. Catalytic converter efficiency is determined by measuring a converter characteristic related to hydrocarbon (HC) treatment efficiency, specifically, the oxygen storage capability of the catalytic converter. Advantageously, the method of the invention is for controlling the air to fuel ratio of an air and fuel mixture fed to an internal combustion engine, for treating exhaust gas from the engine, and for conducting on-board monitoring of the catalytic converter efficiency in treating the exhaust gas.

Exhaust gas is passed from the engine to the catalytic converter through an upstream exhaust gas conduit while exposing it to a first EGO sensor means for generating a first EGO signal having a value corresponding to the oxygen content level of the exhaust gas. Exhaust gas is passed downstream from the catalytic converter through a second exhaust gas conduit means while exposing it to a second EGO sensor means for generating a second EGO signal having a value corresponding to the oxygen content level in the downstream exhaust gas.

Fuel control means are operated for controlling the air to fuel ratio at which fuel is supplied to the engine in response to a fuel flow control signal. Typically, in preferred embodiments, the control signal is based, at least is part, on the first and second EGO sensor signals in accordance with techniques well known to those skilled in the art. Thus, for example, in one preferred embodiment the fuel flow control signal of the fuel control means is generated based on the first EGO sensor to maintain the ratio generally within the conversion window limits defining a range about a mean air to fuel ratio value corresponding to a stoichiometric air to fuel ratio. The mean air to fuel ratio value is adjusted or "trimmed" based on the second, that is downstream, EGO signal in accordance with the aforesaid known techniques. That is, both EGO sensors operate in limit cycle type control loops. In the case of the primary EGO sensor, i.e., the upstream EGO sensor, an internally calculated equivalence ratio is cycled back and forth in response to the state of the primary EGO sensor, in order to control the fuel flow to achieve the desired A/F ratio. In response to this cycling, the primary EGO sensor is continually switching between its rich and lean states. The switch rate varies, for example, with the speed of the engine, and with the load on the engine. The operating point to which the primary EGO sensor is controlling is cycled back and forth, in response to the state of the downstream EGO sensor, in order to keep the engine at the most advantageous A/F ratio for emission reduction. As a result, the downstream EGO sensor is also switching continually between its rich and lean states. The frequency at which the downstream EGO sensor cycles is a measure of the oxygen storage capacity of the catalyst, but is also affected by the speed and load at which the engine is operating.

In the case of a new catalyst, the switching frequency of the primary EGO sensor typically is in the range of ten times the switching frequency of the downstream EGO sensor. As the catalyst degrades, the downstream EGO switching frequency increases, while the primary EGO switching frequency is substantially unaffected directly by catalytic converter degradation. As a result, the ratio of the two frequencies also changes as the catalytic converter degrades. At the level of degradation which it is desired to detect, the ratio of the two frequencies will have a characteristic value for a given system (e.g., for a given motor vehicle powertrain system comprising the engine, fuel control means, catalytic converter, etc.). When the frequency ratio reaches this characteristic value, the monitoring system determines that the catalytic converter has failed. In the dual-loop approach, the impact of the speed and load dependence of the downstream EGO switching frequency is reduced by the normalizing effect of the frequency ratio calculation. As a result, the catalytic converter monitor is reliable over a wide engine operating range.

Thus, an efficiency value for the catalytic converter is determined on the basis of the ratio of the switching frequency of the first EGO sensor means compared to the switching frequency of the second EGO sensor means. The efficiency value is then compared to a predetermined, stored value corresponding to minimum acceptable efficiency of the catalytic converter. A catalytic converter failure signal can be generated, or other action taken, in the event that the comparison of the efficiency value to the stored value indicates catalytic converter efficiency below the minimum acceptable level.

Preferred embodiments of the invention can provide significant advantages, specifically when used for on-board monitoring of the efficiency of a catalytic converter, particularly a three-way catalyst type catalytic converter. Such preferred embodiments, discussed in greater detail below, provide a dual EGO closed loop fuel control system with periodic on-board catalytic converter monitoring. Additional features and advantages of various preferred embodiments will be better understood in view of the following disclosure and detailed description.

BRIEF DESCRIPTION OF THE DRAWINGS

Various preferred embodiments of the invention are described below with reference to the accompanying drawings wherein.

DETAILED DESCRIPTION OF CERTAIN PREFERRED EMBODIMENTS

Those skilled in the art will understand from the foregoing disclosure that the present invention may be embodied in apparatus, method and system for periodic on-board monitoring or diagnosis of the efficiency of a catalytic converter treating exhaust gas from an internal combustion engine. The terms "efficiency" and "efficacy" are used here interchangeably to mean any suitable evaluation of the effectiveness of the catalytic converter in treating exhaust gases. Thus, the aforesaid catalytic converter efficiency value may be determined, stored or expressed as a ratio, a fraction, a percentage, etc. By "periodic" is meant occasionally or intermittently, for example once or more often each time operation is restarted after a period of non-operation. In that regard, reference to initiating the test or test period during substantially steady state operation of the engine means starting the tests when the engine is in dual EGO sensor closed loop operation, preferably under normal speed and load conditions, and not necessarily that the engine will remain under such conditions or even at steady state during the entire planned test period. Typically, a test period of 20 seconds is employed, during which the number of times the upstream EGO sensor switches (from rich to lean and/or visa versa) is counted and stored. Similarly, the downstream EGO sensor switches are counted and stored. The catalytic converter efficiency value is the ratio of these two numbers, or is otherwise determined based thereon. It is advantageous that such catalytic converter monitoring requires no interruption of the normal operating mode of the fuel control system and can even be performed continuously.

As indicated above, the catalytic converter monitoring is advantageously implemented in embodiments comprising a dual EGO sensor closed loop fuel control system utilizing both an upstream and a downstream EGO sensor. Numerous such fuel control systems are well known to those skilled in the art and can be readily adapted, given this disclosure and description of the present invention, to provide the aforesaid catalytic converter on-board monitoring. A suitable dual EGO fuel control system is disclosed in U.S. patent application Ser. No. 724,394 filed Jun. 28, 1991, by A.Y. Gopp, the disclosure of which is incorporated herein by reference. In the Gopp control system, a single PI controller is employed, the output of which is based on input signals including, at least, output signals from both an upstream and a downstream switch-type EGO sensor. The upstream EGO sensor signal is processed through a high pass filter which acts as a real time differentiator. The upstream EGO sensor signal, thus processed, is constantly shifting back and forth in a limit cycle pattern between rich and lean air/fuel ratio, a lean signal from the EGOI sensor causing the control system to provide a richer air/fuel feed to the engine and the eventually resulting rich signal sending the air/fuel feed back to the lean side of stoichiometry. The downstream EGO sensor signal is used to adjust or trim the upstream closed loop control by changing the switch point at which the upstream EGO sensor signal is taken to switch between lean and rich.

For purposes of illustration and not limitation, the preferred embodiments disclosed and discussed below provide dual EGO fuel control apparatus, methods and systems for an internal combustion engine incorporating the on-board catalytic converter monitoring aspect of the invention in dual EGO fuel control apparatus, methods and systems in accordance with such teachings of the A.Y. Gopp patent application. In such preferred embodiments, as described in detail below, an internal combustion engine is provided with a catalytic converter and two EGO sensors, one upstream and the other downstream of the converter. The fuel control system includes a first comparator for generating a first signal from the output signal of the upstream EGO sensor. Such first signal has a constant absolute value (e.g., "one") but varies in sign as a function of the upstream EGO sensor output signal. A second comparator, or alternatively limiting means, generates a second signal as a function of the downstream EGO sensor signal. The second signal also has a constant absolute value, varying in sign as a function of the downstream EGO sensor output signal. Corrective means comprising a high pass filter responsive to the first signal generates a third signal. Means to combine the scaled second signal with the third signal generate a fourth signal and control means using a PI controller responsive to the fourth signal generates an air/fuel ratio correction signal. Preferably the control system further provides means for open loop control of the air/fuel mixture, independent of the EGO sensor output signals, during certain periods, for example, initial engine operation while one or both EGO sensors have not reached operational temperature.

Figure 1:
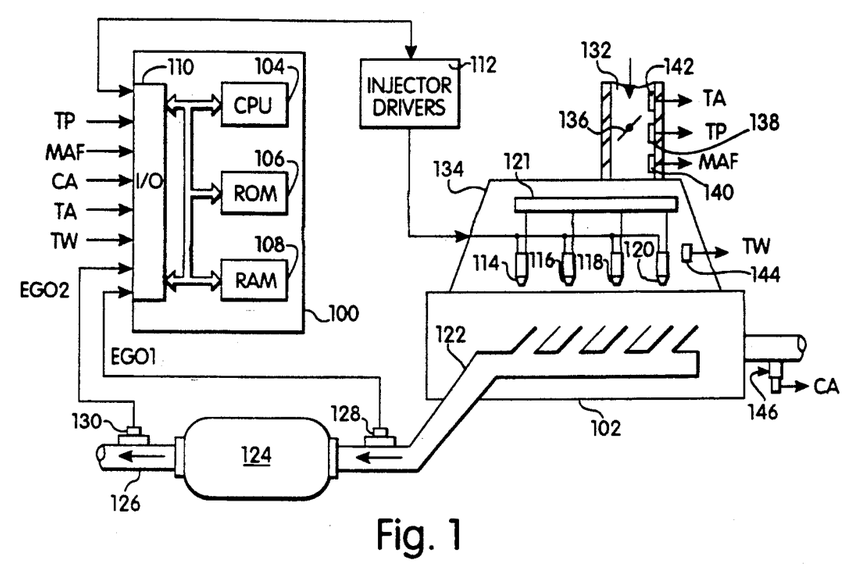
FIG. 1 is a schematic view of a motor vehicle internal combustion engine together with apparatus for controlling the air/fuel ratio of the air and fuel mixture to the engine, for treatment of the exhaust gas from the engine, and for periodically monitoring catalytic converter efficacy in the treatment of the exhaust gas in accordance with a preferred embodiment of the invention.

Referring to FIG. 1, microcomputer 100 is shown for controlling an air/fuel ratio supplied to an internal combustion engine 102. Microcomputer 100 comprises a central processing unit (CPU) 104, a read-only memory (ROM) 106 for storing a main engine control routine and other routines, such as a fuel flow routine and calibration constants, look-up tables, etc., a random access memory (RAM) 108, and a conventional input/output (I/0) interface 110. Interface 110 includes analog to digital (A/D) converters for converting various analog input signals, digital inputs, digital to analog (D/A) converters for converting various digital outputs, and digital outputs.

Microcomputer 100 also includes other conventional elements, such as a clock generator and means for generating various clock signals, counters, drivers, and the like. Microcomputer 100 controls the air/fuel ratio by actuating injector drivers 112 in response to operator actions and various operating conditions and parameters of engine 102. Microcomputer 100 fetches input parameters and performs calculations of control signals at a fixed sampling interval DELTA T ($\Delta T$) such as, for example, 20 msec. If microcomputer 100 is designed to operate with a variable sampling rate, a timer which can perform time measurement between two successive samplings and assign a measured sampling time DELTA T should be provided.

Engine 102, in this particular example, is shown as a conventional four cylinder gasoline engine having fuel injectors 114, 116, 118 and 120 coupled to a fuel rail 121. Each fuel injector is electronically activated by respective signals from injector driver 112. Each of the injectors 114, 116, 118 and 120 is also coupled in a conventional manner to a respective combustion cylinder. Exhaust gases from the combustion cylinder are routed to an exhaust manifold 122 and are discharged through a three-way catalytic converter 124 which removes CO, HC and $NO_x$ pollutants from the exhaust gas, and exhaust pipe 126. In the exhaust manifold 122, upstream of the catalyst 124, is a first EGO sensor 128 (EGO1) for detecting oxygen concentration in the upstream engine exhaust gases. In the exhaust pipe 126, downstream of the catalyst 124, is a second EGO sensor 130 (EGO2) for detecting oxygen concentration after catalyst 124. Both EGO sensors 128 and 130 generate output voltage signals which are transmitted to the analog to digital converter of I/0 interface 110. Various suitable alternative switch-type EGO sensors are known and will be apparent to those skilled in the art, including heated EGO (HEGO) sensors, etc. In that regard, the discussion of exemplary suitable EGO sensors in U.S. Pat. No. 5,077,970 to Hamburg is incorporated herein by reference.

Air intake 132 is shown coupled to intake manifold 134 for inducting air past throttle plate 136 into the combustion cylinders. Throttle position sensor 138 is coupled to throttle plate 136 for providing a throttle position signal TP. Also coupled to intake manifold 134 are mass airflow sensor 140 for providing mass airflow signal MAF corresponding to the mass of the airflow induced into engine, and air temperature sensor 142 for providing a signal TA indicative of the temperature of the induced air. Coupled to the cylinder block of engine 102 is a cooling water temperature sensor 144 for providing signal TW indicative of the engine coolant temperature. Crank angle position sensor 146 is coupled to the crankshaft of engine 102 for providing crank angle position signal CA indicative of crank position.

A manifold pressure sensor MAP may be used instead of a mass airflow sensor 140 to provide an indication of engine load by known techniques. Other conventional components necessary for engine operation, such as a spark delivery system are not shown in FIG. 1. It is also recognized that the invention may be used to advantage with other types of engines, such as engines having a number of cylinders other than four, rotary engines, etc.

Figure 2:
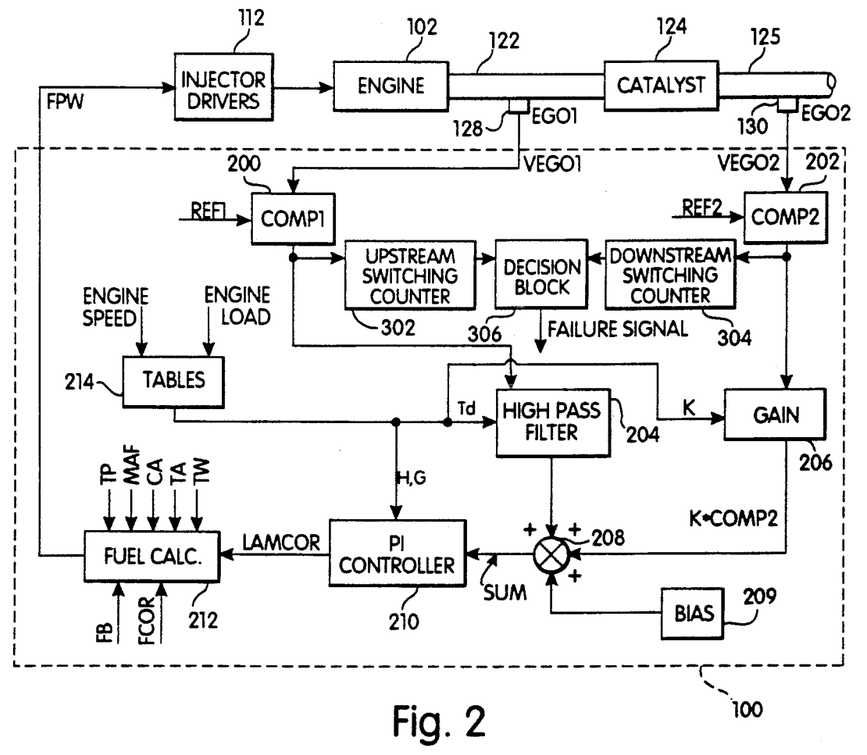
FIG. 2 is a control block diagram of the fuel control, exhaust treatment and monitoring system of the embodiment of FIG. 1.
Figures 3, 4:
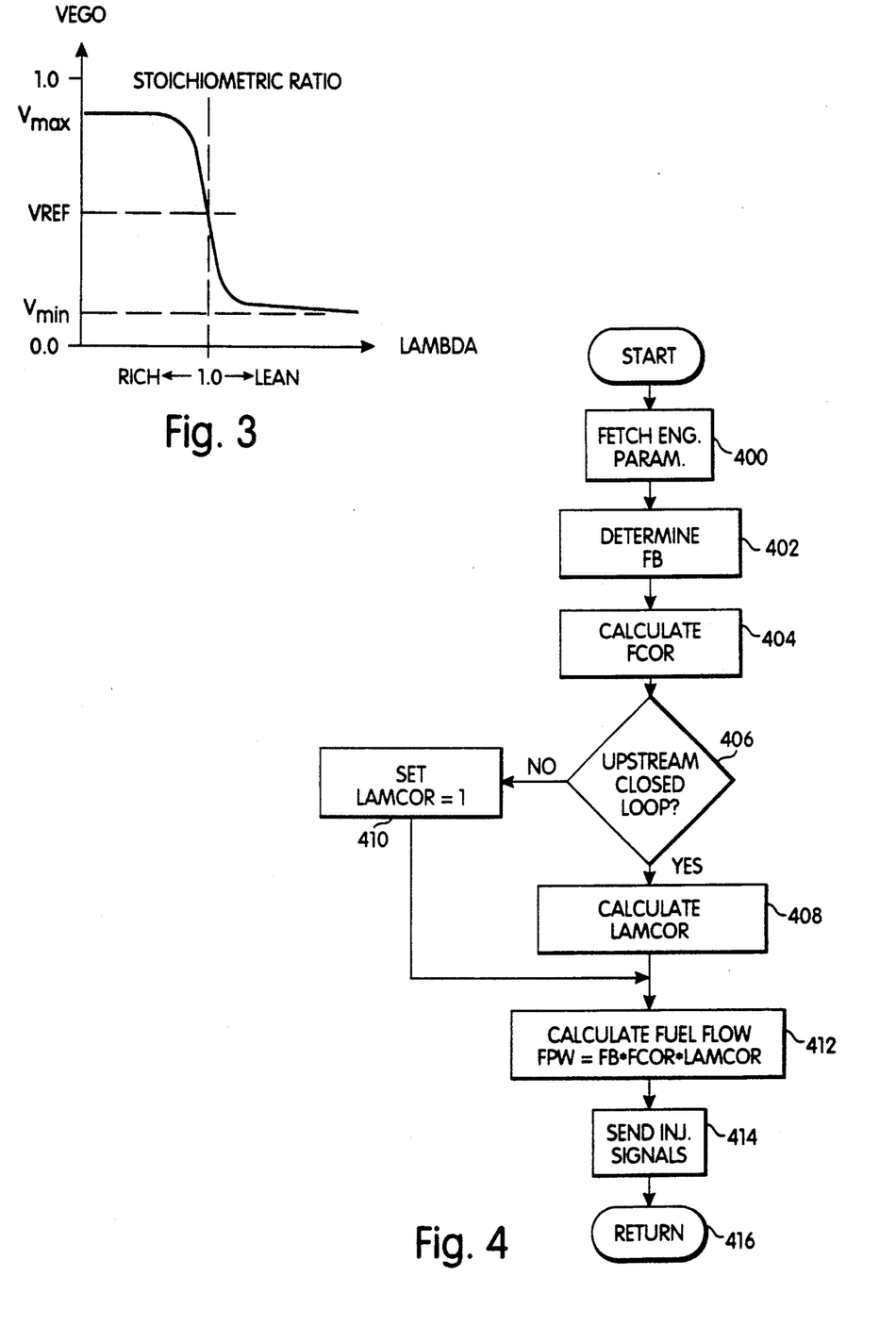
FIG. 3 is a graph showing voltage output of an EGO sensor as a function of the air/fuel ratio LAMBDA.
FIG. 4 is a flow chart illustrating process steps performed in calculating fuel flow rate FPW during normal operation of the apparatus of FIGS. 1 and 2.

The operation of a dual EGO sensor closed loop fuel control system in controlling air/fuel ratio is now described with particular reference to a control block diagram shown in FIG. 2 and the associated graph in FIG. 3 showing the EGO sensor output voltage VEGO as a function of LAMBDA, the air/fuel ratio relative to air/fuel stoichiometric ratio.

Output voltages VEGO1 and VEGO2 from upstream EGO1 sensor 128 and downstream EGO2 sensor 130, respectively, are fed through an A/D converter in I/0 device 110 to respective comparators 200 and 202. Each comparator is supplied with reference signals REF1 and REF2, respectively, corresponding to EGO output voltage at stoichiometric ratio, VREF, as shown in FIG. 3. Each comparator 200 and 202 produces an output signal COMP1 and COMP2, respectively, having a constant absolute value, but varying in sign depending upon which side of stoichiometric ratio the corresponding EGO output voltage signal, VEGO1 and VEGO2, respectively, is.

The output COMP1 of comparator 200 is modified by a corrective block 204. Corrective block 204 is preferably a high pass filter which in this embodiment is presented as a first order high pass filter, but may be a higher order high pass filter. The first order high pass filter, also known in the control field as a real time differentiator, may be described by the following differential equation:

$$T_d * d(DIF)/dt + DIF = d(COMP1)/dt \qquad \text{(Eqn. 1)}$$

where:
DIF = the first order high pass filter output signal;
$T_d$ = time constant of the filter, a calibratable parameter of the control system; and
d(...)/dt = symbol indicating the first derivative of the respective signal.

The difference equation suited for digital microcomputer computations is derived from (Eqn. 1) and in the simplest form is:

$$DIF(i) = \left(\frac{1 - \text{DELTA } T}{T_1}\right) \cdot DIF(i-1) +$$

$$(COMP1(i) - COMP1(i-1))$$

where:
DELTA T microcomputer sampling interval discussed above; i and i-1 indicate current and previous results of calculations or measurements.

The output COMP2 of the second comparator 202 is connected to gain block 206 with a constant gain K, so that output signal of comparator 202 is equal to K*COMP2. During normal operating mode, output signals of both comparators 200 and 202 are summed together with an additional bias signal BIAS by a summing block 208. The bias signal BIAS is provided for calibration purposes, serving in effect to modify reference signal REF2 if desired. The output signal SUM of the summing block is calculated as follows:

$$SUM = DIF + K*COMP2 + BIAS \qquad \text{(Eqn. 2)}$$

The SUM signal is fed to a controller block 210. Controller block 210 is preferably a proportional and integral (PI) controller, performing calculations described by the following differential equation:

$$d(LAMCOR)/dt = H*d(SUM)/dt + G*SUM \quad (Eqn. 3)$$

where:
LAMCOR is the output signal of the PI controller and represents an air/fuel ratio correction amount; and
H and G are jumpback and ramp, respectively, of the PI controller, calibratable parameters of the control system.

A difference equation suited for digital microcomputer computations is derived from (Eqn. 3) and in the simplest form is: LAMCOR(i) LAMCOR(i−1)+H*-(SUM(i)−SUM(i−1))+G*DELTA T*SUM(i−1). Those skilled in the art will recognize that presentation of the differential equations (Eqn. 1) and (Eqn. 3) in the form of the difference equations may be done in different form. Control system calibratable parameters H, G, K. and Td may be modified as a function of speed/load tables (214). Also, though this description is related to microcomputer realization, the control system also can be implemented by analog means.

Fuel calculation block 212 calculates fuel flow rate FPW, a control signal to the injector drivers 112, in a conventional manner using the air/fuel correction amount signal LAMCOR from PI controller 210 as follows:

$$FPW = FB*FCOR*LAMCOR$$

where:
FB is the base open loop fuel flow as a function of engine load/speed table fetched from ROM 106 storage or stored in fuel calculation block 212;
FCOR is a fuel correction amount based, for example, on engine warm-up temperature, battery voltage and the like, also preferably from look-up tables; and
LAMCOR is defined above.

The operation of microcomputer 100 in controlling fuel flow is now described with particular reference to the flowchart shown in FIG. 4. It will be recognized by those skilled in the art, that the fuel control sub-routine illustrated in FIG. 4 typically will be one of a series of sub-routines performed repeatedly in sequence in the course of engine control, along with, for example, a spark control sub-routine, an EGR sub-routine, etc.

At the start of each sampling interval, engine parameters are fetched in step 400. Engine speed and load are then computed in a conventional manner from crank position signal CA and mass airflow signal MAF. During step 402, base open loop fuel injection amount FB is determined by look-up and interpolation of speed/load table from ROM 106 storage. At step 404, fuel correction amount FCOR is calculated based on inputs, for example, intake air temperature TA and cooling water temperature TW, battery voltage, and the like.

Step 406 checks whether upstream EGO sensor 128 is warmed-up sufficiently and/or other conditions are met to start closed loop operation. These conditions may include, but are not limited to, cooling water temperature TW reaching a preselected limit, inlet air temperature TA, observed EGO sensor switching, elapsed time since start, and the like. Also, some engine operations, such as wide open throttle or prolonged idle, may require open loop control even after closed loop conditions are otherwise met. The engine can operate with both upstream open loop and downstream open loop control, that is, the signals from both the upstream EGO sensor and the downstream EGO sensor are disregarded. Typically, this occurs, for example, during cold start-up and/or any time the EGO sensors are not sufficiently heated. If the control system is in upstream open loop control, then in the preferred embodiment here described it will also always be in downstream open loop control. In some conditions, it will have upstream closed loop (i.e., the control system will receive and use the upstream EGO sensor signal) with downstream open loop. This may occur, for example, when the upstream EGO sensor has been sufficiently heated but the downstream EGO sensor has not yet been sufficiently heated, and/or during some hard acceleration conditions, as is well understood by those skilled in the art. Under normal, routine conditions, however, the system will employ upstream closed loop and downstream closed loop control.

If closed loop control is called for, step 408 calculates air/fuel ratio correction amount LAMCOR, the output signal of PI controller 210 representing an air fuel ratio closed loop correction amount. Otherwise, in step 410 LAMCOR is set to 1. The frequency of the limit cycle is mainly determined by parameters of the upstream portion of the control system. However, the downstream EGO sensor provides a bias which shifts the rich/lean switching point for the upstream EGO sensor signal. The output of downstream EG02 sensor is centered around (i.e., switches from one side to the other of) its reference voltage REF2. Logic flow from both step 410 and 408 goes to step 412 which calculates a final fuel flow FPW based on the main fuel flow equation given above:

$$FPW = FB*FCOR*LAMCOR$$

and actuates fuel injectors accordingly in step 414. Step 416 returns the system from the fuel flow calculation routine to the main routine.

Figure 5:
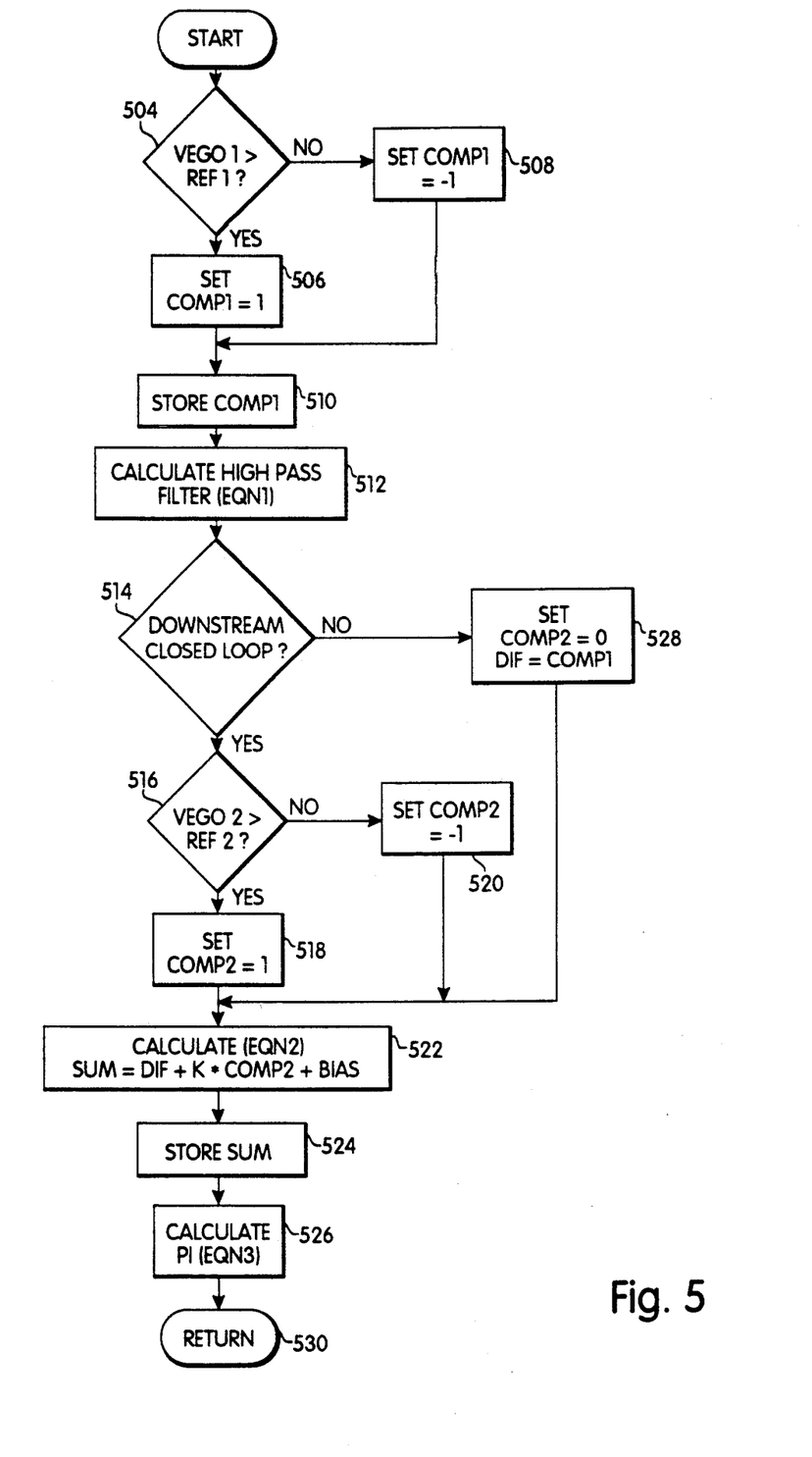
FIG. 5 is a flow chart illustrating process steps performed in calculating the air/fuel ratio correction amount LAMCOR in the preferred embodiment of FIGS. 1 and 2.

The calculation of air/fuel ratio correction amount LAMCOR in step 408 is now described with particular reference to the flowchart shown in FIG. 5. Steps 504, 506, and 508 describe the first comparator 200 and compute its output COMP1. The value of COMP1 is stored in RAM 108 in step 510 for use in the next sampling interval. Step 512 performs computation pertinent to (Eqn. 1) which describes high pass filter 204. Then, step 514 checks whether downstream EGO sensor 130 is warmed up sufficiently and any other requirements are met to start downstream closed loop operation. These conditions are similar to the conditions for upstream closed loop operation discussed above (see step 406). If the conditions are met, steps 516, 518, and 520 compute the output signal COMP2 of the second comparator 202.

Step 522 represents summing block 208 and computes (Eqn. 2). The output value SUM from step 522 is stored in RAM 108 in step 524 for use in the next sampling interval. Step 526 performs computation pertinent to (Eqn. 3) which describes PI controller 210. Step 530 returns this routine to step 412 of the fuel flow calculation. If conditions in step 514 are not met, step 528 sets COMP2 equal to 0, and DIF equal to COMP1, thus disabling the second closed loop operation and high pass filter. Step 528 then proceeds to step 522. Thus, automatic transfer is provided from one EGO to dual EGO sensor closed loop fuel control.

Figure 6:
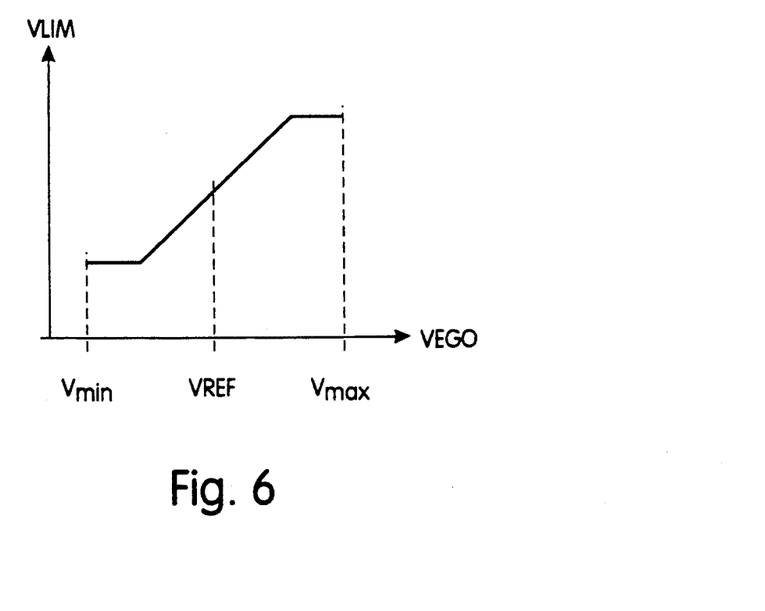
FIG. 6 is a graph showing voltage output of a limiter used in accordance with an embodiment of the invention.

In another embodiment of the invention, a limiting block may be substituted for the second comparator 202. Voltage characteristic of the limiter shown in FIG. 6 has a gain of 1 in the vicinity of the reference voltage, and its upper and lower limits are set symmetrically about the reference voltage and do not extend beyond minimum $V_{min}$ and maximum $V_{max}$ voltages of EGO sensor output signal VEGO. Calculation of air/fuel ratio correction amount LAMCOR for this embodiment is similar to the main embodiment. In this case, steps 516, 518, and 520 of FIG. 5 are replaced by the calculation of value LIM for the limiter, corresponding to the value of COMP2 in the main embodiment. If conditions are not met for downstream closed loop control, then LIM is set equal to zero and DIF equals COMP1. The summing block then computes output value SUM:

$$SUM = DIF + K^*LIM + BIAS$$

which equation should be recognized to correspond to (Eqn. 2) of step 522 in the main embodiment.

It is understood that during different engine operations, specifically, at different speeds and loads, control system calibratable parameters may require readjustments for optimal control. These parameters include jumpback H and ramp G of PI controller 210, time constant $T_d$ of high pass filter 204, gain K of gain block 206, and bias signal BIAS to summing block 208. To achieve a recalibration of all or any combination of said parameters, a number of functions or tables (e.g., table 214 in FIG. 2) with engine speed and load as inputs may be incorporated in the flowcharts shown in FIG. 5 and 7. It is also understood that certain measures, such as time delays or low pass filters, may be employed to protect the control system from effects of high frequency EGO sensor switching. Such modifications can be readily incorporated into various preferred embodiments of the invention by those skilled in the art in view of the present disclosure.

Operation of the system for periodic catalytic converter monitoring while continuing to control fuel flow to the engine is now described with reference to FIGS. 2 and 7. A test interval typically will commence during substantially steady state engine operation and will span about 20 seconds. Multiple attempts may be required before a valid test is completed. One or multiple valid tests may be run during a given period of continuous operation. A monitoring test is commenced during normal closed loop operation. The term "periodic" is used to mean occasionally or intermittently, for example, once (or more often) each time engine operation is restarted after a period of non-operation. In that regard, reference to initiating the test period during substantially steady state operation of the engine means starting the test period when the engine is in dual closed loop operation, not necessarily that all engine operating parameters are constant, and not necessarily that the engine will remain at steady state during the entire planned test period.

Referring first to FIG. 2, the signals VEGO1 and VEGO2 from the upstream and downstream EGO sensors, respectively, preferably after signal processing to the corresponding signals COMP1 and COMP2, respectively, are processed by switching counters 302 and 304, respectively. Aided by the present disclosure, it is well within the ability of those skilled in the art to incorporate suitable switching detection and counter means, and also associated decision block means discussed below, into known fuel control systems. The switching detection and counter means may comprise, for example, one or more registers in the microprocessor 100. Switching counter 302 counts the number of times during the test period that the signal from upstream EGO sensor 128 switches from rich to lean and/or from lean to rich. Similarly, the counter 304 counts the number of times during the test period that the signal from downstream EGO sensor 130 switches. The counts from each are fed to decision block 306 which determines a catalytic converter efficiency value based on the ratio of the two counts. The decision block then compares the resulting catalytic converter efficiency value to a stored value predetermined to correspond to minimum acceptable catalytic converter efficiency. The stored value can be readily predetermined empirically by those skilled in the art and will depend upon the particular engine and exhaust system characteristics. Typically, for example, for a well functioning catalytic converter, the upstream EGO sensor may switch ten times for each downstream EGO sensor switch. As the catalytic converter degrades, the ratio moves closer to one-to-one. Thus, the stored value is selected to correspond to the minimum catalytic converter performance level, for example, 45% efficiency.

If the determined efficiency value indicates unacceptably low catalytic converter efficiency, the decision block generates a failure signal or initiates other appropriate action. Optionally, the failure signal may trigger a light and/or sound alarm to the vehicle operator. Also optionally, a pass signal may be generated when the test result indicates acceptable catalytic converter performance.

Figure 7:
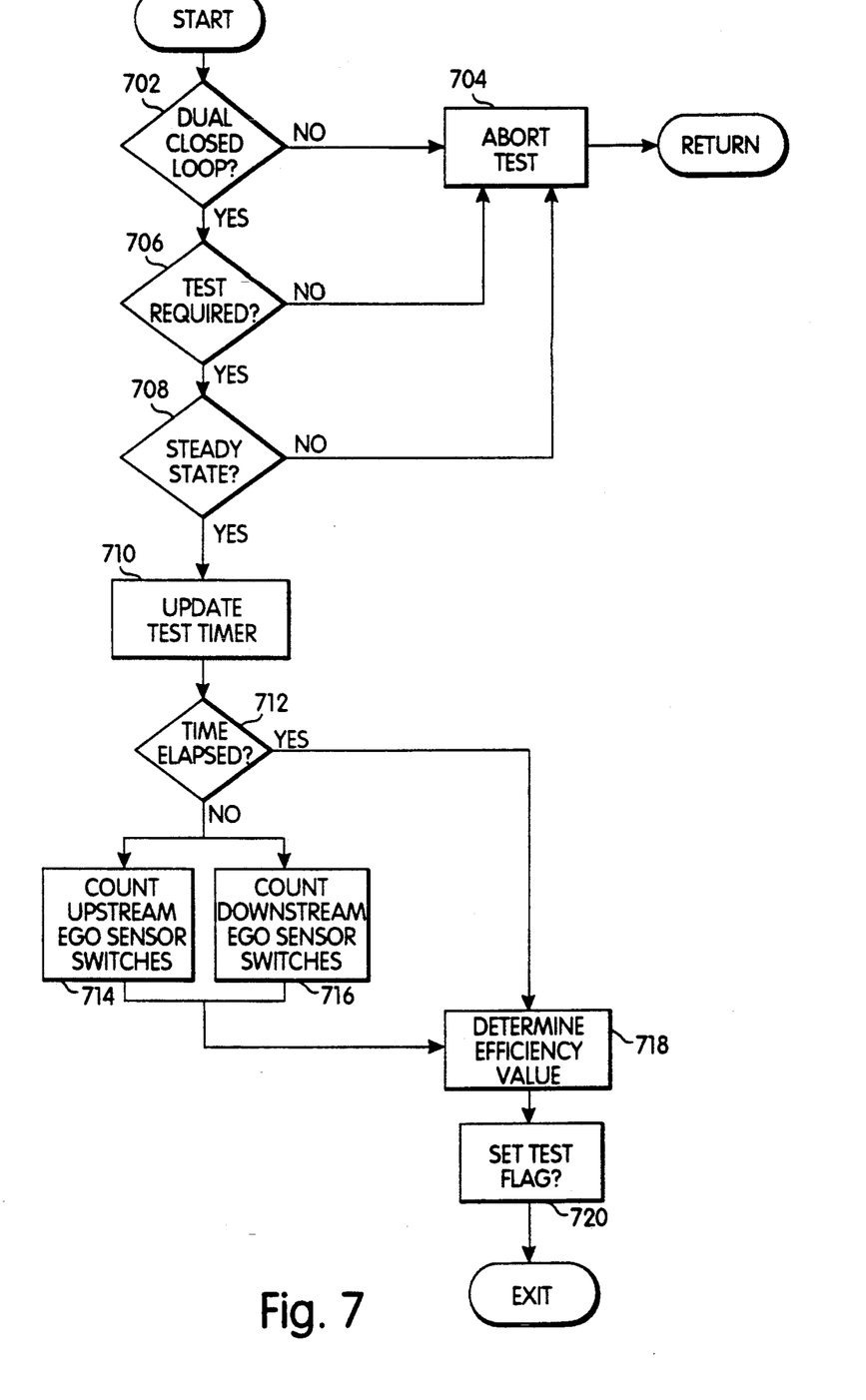
FIG. 7 is a flow chart illustrating process steps to perform catalytic converter monitoring in accordance with the embodiment of FIGS. 1 and 2.

Referring now to the logic flow diagram of FIG. 7, the process steps of the catalytic converter monitoring are seen to comprise determining in step 702 whether dual closed loop conditions are met. If not met, the test is aborted in step 704 and the logic flow returns to the main engine control routine. Typically, the monitoring sub-routine would be commenced again in the course of the next cycle. The logic flow next includes decision block 706 to determine whether a catalytic converter test is required. A test may be required, for example, if a test has not been successfully completed during the present operation of the engine since start-up following a period of non-operation. If a test is not required, the test is aborted as before. If a test is required, steady state conditions are verified in step 708. In addition, step 708 may check whether additional pre-conditions are met. Applicable government regulations may specify and define vehicle and engine speed and load conditions, upstream and downstream EGO sensor warm-up, etc. If all such conditions are met, logic flow proceeds to step 710. Applicable regulations may require that the test be completed in a specified time period, for example, 20 seconds. Preferably, therefor, microcomputer 100 comprises a timer to monitor the time elapsed since test initiation. The timer is updated in step 710. Step 712 checks whether the preset test duration has expired. If the test duration time has not expired, counting block 714 initiates or continues counting switching of the upstream EGO sensor signal and updates the count to calculation block 718. Similarly, counting block 716 initiates and/or continues counting switchings of the downstream EGO sensor signal and updates the count to calculation block 718. If the test time period has expired, calculation block 718 calculates the catalytic converter efficiency value and compares it to the stored value predetermined to correspond to minimum acceptable catalytic converter efficiency. The counter is reset to zero when a test is completed or aborted. If called for by block 718, block 720 initiates a failure signal, as described above.

The reading of the foregoing description of certain preferred embodiments by those skilled in the art will bring to mind further alterations and modifications within the spirit and scope of the invention. It is intended that the scope of the following claims include all such alternations and modifications.

I claim:

1. An apparatus for monitoring catalytic converter efficiency in treating exhaust gas from an internal combustion engine, comprising:

a catalytic converter;

first exhaust gas conduit means for passing upstream exhaust gas from the engine to the catalytic converter;

switch-type first EGO sensor means exposed to the upstream exhaust gas for generating a first EGO signal corresponding to oxygen content level of the upstream exhaust gas;

second exhaust gas conduit means for passing downstream exhaust gas from the catalytic converter;

switch-type second EGO sensor means exposed to the downstream exhaust gas in the second exhaust gas conduit means, for generating a second EGO signal corresponding to oxygen content level in the downstream exhaust gas;

fuel control means having a normal operating mode for controlling the air to fuel ratio at which fuel is supplied to the engine in response to a fuel flow control signal generated by a dual closed loop feedback system based at least in part on switching frequency of both said first EGO sensor means and said second EGO sensor means; and comparison means for determining a catalytic converter efficiency value based on the ratio of switching frequency of the first EGO sensor means and second EGO sensor means during operation of said fuel control means in said normal operating mode and for comparing the efficiency value to a predetermined stored value corresponding to minimum acceptable efficiency of the catalytic converter, and for initiating a catalytic converter failure signal when the catalytic converter efficiency value indicates catalytic converter efficiency below the minimum acceptable efficiency.

2. Apparatus for controlling the air to fuel ratio of an air and fuel mixture fed to an internal combustion engine, for treating exhaust gas from the engine, and for periodically monitoring catalytic converter efficiency in treating the exhaust gas, comprising:

a catalytic converter;

first exhaust gas conduit means for passing upstream exhaust gas from the engine to the catalytic converter, comprising first EGO sensor means exposed to the upstream exhaust gas for generating a first EGO signal having a value corresponding to oxygen content level therein;

second exhaust gas conduit means for passing downstream exhaust gas from the catalytic converter, comprising second EGO sensor means exposed to the downstream exhaust gas for generating a second EGO signal having a value corresponding to oxygen content level therein;

fuel control means having a normal operating mode for generating a fuel flow control signal generated by a dual closed loop feedback system based, at least in part, on the first EGO signal and the second EGO signal, for controlling the air to fuel ratio at which fuel is supplied to the engine; and comparison means for determining a catalytic converter efficiency value based on the ratio of switching frequency of the first EGO sensor means and second EGO sensor means during operation of said fuel control means in said normal operating mode and for comparing the efficiency value to a predetermined stored value corresponding to minimum acceptable efficiency of the catalytic converter, and for initiating a catalytic converter failure signal when the catalytic converter efficiency value indicates catalytic converter efficiency below the minimum acceptable efficiency.

3. A method for monitoring catalytic converter efficiency in treating exhaust gas from an internal combustion engine, comprising:

(A) passing exhaust gas from the engine to the catalytic converter through first exhaust gas conduit means while exposing the exhaust gas to a switch-type first EGO sensor means for generating a first EGO signal corresponding to oxygen content level therein;

(B) passing exhaust gas from the catalytic converter through a second exhaust gas conduit means while exposing it to a switch-type second EGO sensor means for generating a second EGO signal corresponding to oxygen content level therein;

(C) operating fuel control means having a normal operating mode for controlling the air to fuel ratio at which fuel is supplied to the engine in response to a fuel flow control signal generated by a dual closed loop feedback system based at least in part on switching frequency of both said first EGO sensor means and said second EGO sensor means; and (D) determining a catalytic converter efficiency value based on the ratio of switching frequency of the first EGO sensor means and the second EGO sensor means during operation of said fuel control means in said normal operating mode, and comparing the efficiency value to a predetermined stored value corresponding to minimum acceptable efficiency of the catalytic converter.

4. The method of claim 3 further comprising initiating a failure signal when the catalytic converter efficiency value indicates catalytic converter efficiency below the minimum acceptable efficiency.

* * * * *